June 9, 1942.  J. M. MERLE  2,285,740
APPARATUS FOR PRODUCING SOLID AND TUBULAR PRODUCTS
FROM UNDERCOOLED MOLTEN MATERIAL
Filed July 1, 1938   3 Sheets-Sheet 3

INVENTOR
Joseph M. Merle
By Green & McCallister
His Attorneys

Patented June 9, 1942

2,285,740

UNITED STATES PATENT OFFICE 2,285,740

APPARATUS FOR PRODUCING SOLID AND TUBULAR PRODUCTS FROM UNDER-COOLED MOLTEN MATERIAL

Joseph M. Merle, Tarentum, Pa.

Application July 1, 1938, Serial No. 216,968

5 Claims. (Cl. 22—200.1)

My present invention relates to apparatus and procedure adapted to produce solid and tubular products from undercooled metals, alloys, and other molten materials. This application is, in part, a continuation of my copending application for Process for making metal products, filed May 5, 1934, under Serial No. 724,186, now Patent No. 2,129,702, issued September 13, 1938.

While the procedure and apparatus disclosed in my aforesaid copending application and the products produced are eminently satisfactory, I have, nevertheless, discovered through further studies and investigations that, by making certain modifications as hereinafter described and claimed appertaining to the apparatus there described by me, I make it possible to produce new and commercially important solid and tubular products which are characterized by excellent physical properties and by a special new primary crystal structure.

It is, accordingly, one of the objects of my present invention to provide apparatus which is especially suitable for the production of new solid and tubular products from undercooled molten materials.

Another object of the invention resides in apparatus which is simplified as compared with previous apparatus and which is subject to close and accurate control, thus giving new and additional advantages over such prior apparatus.

An additional object of the invention resides in apparatus especially designed to produce continuous castings either in rod-like form or in the form of a seamless tube as well as molded or die cast products.

A further object of the invention resides in the provision of apparatus which mechanically and functionally represents advances over what has been heretofore developed in this art and which is sensitive to control factors and to the particular nature of the molten material handled thereby, in which connection the apparatus is susceptible of adjustment so as to vary the so-called undercooling period.

A still further object of this invention is the discovery and definition of means and conditions for the continuous treating of molten metals and alloys preliminary to their introduction into molds or dies or between shaping rolls to produce and control a definite state of undercooling such as will induce and create in the finished solid metal product a fine, uniform and homogeneous new primary crystalline structure.

Another object of this invention is the description of commercial machinery and equipment developed to continuously undercool under controlled conditions molten metals and alloys or non-metallic materials previous to their introduction into molds or dies or between rolls, and to subsequently introduce or force the undercooled metal or alloy without any change in its condition or composition into the mold or die or between rolls in the form of a thin consolidated stream projected under controlled velocity to produce metal products with the above homogeneous fine crystalline structure.

Another object of the invention is the production of metal products of many kinds from metals and alloys in a controlled undercooled state or within their plastic range and not from metals and alloys in their molten state.

Another object of this invention resides in procedural features and steps for continuously treating metals and alloys in their molten state to place them in any desired state of undercooling and in that state of undercooling to introduce them into molds or dies or between rolls without disturbing, affecting, or modifying their original homogeneous chemical composition or inherent characteristics in any manner and without any contact with or contamination by outside gases or air, none being required or used for cooling, propelling, or impacting purposes in this invention.

Other and further objects and advantages reside in the various combinations, subcombinations, and details of construction hereinafter described and claimed and in such other and further matters as will either be understood by those skilled in this art or will be apparent from the following description.

In the accompanying drawings.

Most present day metal products originate from molten metal which has been poured into an ingot mold, a sand mold, a die or between forming rolls while in the liquid state. As the temperature decreases the molten metal passes to the solid state, the solid crystals forming first against the mold, die or roll walls and propagating towards the inner section of the product through the still liquid core and giving the cast products a structure consisting of three distinct zones having different characteristics, viz:

A. A chill layer or skin at the periphery of the product made up of small, stringer-like at random (not oriented) crystals. The physical properties of this chill layer are usually much better than those of the other parts of the product and of the finished product after mechanical working. This is due to the fact that its chemical composition is homogeneous, free of segregation and corresponds exactly with the composition of the molten metal, the latter being homogeneous in the furnace or ladle.

B. A layer of long columnar crystals (also called dendrites or needles) oriented with respect to the axis of the crystal growth which is opposite to the direction of the heat flow.

C. A central zone of equiaxed large crystals.

This heterogeneous crystalline structure is further characterized by selective segregation of alloy constituents and impurities, by gas pockets, shrinkage, cavities and/or piping as well as other known phenomena defined under the general name of ingotism. This ingotism is primarily responsible for the heterogeneous crystalline structure found in practically all present day commercial metal products.

This common method of producing metal products has a determining influence upon the physical and other properties and characteristics of commercial products either in their cast or in their worked condition such as after forging, rolling, extruding or mechanical forming as well as in their heat treated condition. This is because it is generally admitted that the (secondary) structure of the final product still retains or is affected by some of the characteristics of its original heterogeneous crystalline formation at the time of solidification from molten metal since this prevents the attainment of the optimum theoretical properties.

The goal of metallurgy for years has been the attainment of a truly homogeneous and uniform crystalline structure in metal products and the development of dependable methods to obtain it.

Various recent researches and investigations in the crystallization of metals have shown that the at random fine crystalline structure of the chill layer of an ingot is due to under-cooling as a result of its contact with the cold walls of the mold which creates practically spontaneous crystallization free of any segregation in the chill layer, this fast chilling or crystallization being responsible for the change from an oriented to an at random (unoriented) stringer-like crystalline structure. The section of the crystals in the chill layer becomes smaller as the velocity of crystallization increases. In general, the primary structure of any metal is controlled by the two following factors:

A. The number of crystal nuclei per unit of weight and time at a definite temperature.

B. The velocity of crystallization which depends on how fast the latent heat of fusion can be dissipated.

The term "undercooling" as used above and as defined in physics is a condition which occurs when, at a definite temperature close to or under the crystallization point, equilibrium conditions are not reached; that is, the solid phase does not occur. Thus the metal is in a meta-stable condition. Researches in the undercooling of metals and alloys have shown that this condition may exist in metals undercooled 0.1° to 0.3° C.; for other metals such as gold, copper, bismuth, antimony, lead, tin, and a number of alloys undercooling may reach 30° to 45° C., so that all metals and alloys can be placed in an undercooled condition in which they retain most of the mobility of a liquid, although part of the solid phase may be precipitated, and in that condition the metals and alloys flow and shape themselves in molds or dies.

To make clear the distinction between the molten and the undercooled states, above referred to, the molten state is that in which the molten metal or alloy is liquid and capable of flowing freely by gravity; its total heat content is the amount of heat required to bring it to its fusion point plus the amount of heat required for its latent heat of fusion plus the extra amount of heat put in as superheat for commercial handling which may range from a few degrees F. to 200 to 300 degrees F. as in the case of steel or alloy steel or other high melting point metals or alloys. The undercooled state as applied to metals and alloys and which I propose to establish and control is a condition which results from treating any molten metal or alloy as produced by present commercial furnaces to remove from it all its superheat of fusion and all or most of its latent heat of fusion to bring its temperature either close to its crystallization point or slightly therebelow for metals and alloys having a long plastic range before the treated metal or alloy is introduced or forced or propelled into a mold or die or between rolls at a definite velocity. This undercooled metal or alloy introduced into molds or dies or between rolls in that condition has still most of the mobility of a liquid and will, under the velocity at which it is propelled, readily shape itself to the contour of molds or dies. It is further characterized by the fact that each of its minutest component particles has already a crystal nucleus extending to part or to the whole of each particle depending upon how much of the solid phase has been precipitated as controlled by the degree of undercooling. These undercooled particles propelled in a stream into a mold or die will simultaneously conform to the contour of the mold or die to fill it and practically spontaneously crystallize from an infinite number of crystal nuclei throughout the whole mass of the formed product, which creates in the formed product a crystalline structure made of very small stringer like at random crystals homogeneously and uniformly distributed throughout the whole solid metal product, this being strikingly different from the primary structure obtained from molten metal or alloy as described hereinbefore.

From the above researches and investigations made by various scientists, it becomes evident that if a metal or an alloy could be introduced or forced into a mold or a die or between forming rolls undercooled in such a way that it has the maximum number of crystal nuclei per unit of weight and at a temperature such that its latent heat of fusion has been partially or totally removed, this metal or alloy as it flows and shapes itself into the mold or die would spontaneously crystallize throughout the whole mass of the formed product in a manner similar to the spontaneous crystallization of the chill layer of an ingot, giving the whole mass of the product the same crystalline structure made of small stringer like at random crystals and the optimum physical properties.

I have observed the following: If a drop of liquid, be it water, oil, or molten metal, falls upon a fast moving surface of a substance which the liquid will wet, every portion of the liquid drop as it comes in contact with the fast moving surface will wet the surface and adhere to it and be elongated and carried by it to form an elongated streak or film of uniform thickness with two parabolic-like ends, the shape, width, length and thickness of which is determined by the relative velocity of the falling drop and the directional velocity of the moving surface. Further, in the case of a molten metal drop, the elongation of it and its crystallization into a solid film or strip are practically simultaneous. The method I use for undercooling is derived from the above observation but instead of a drop of liquid I use a stream of molten metal, as produced by industrial furnaces.

A stream of molten metal discharging onto a rapidly moving surface which it will wet gives rise to certain definite actions. When such a stream of molten metal or other molten substance flowing out of a furnace spout or pouring nozzle at the normal pouring temperatures industrially used and at a certain rate of velocity of flow—as determined by the head of metal in the receptacle, ladle, or furnace which contains it or as governed by mechanical pumps or valves which propel it out of the container—is intercepted by a clean, colder solid metal or non-metallic surface free of moisture moving at a uniform rate of speed greater than the velocity of flow of the molten metal stream, a continuous area of contact is created at the intersection where the liquid and freely mobile metal or substance instantaneously shapes itself to the solid moving surface. This I term a wetting action. Under these conditions the molten or liquid metal is instantaneously and continuously carried away from the main body of the liquid stream, being pulled away from under it in a layer adhered to the moving surface. This layer is hydrostatically self-leveling while being carried across the molten stream and carries with it as much of the molten metal or substance as it can attract under its intrinsic forces of atomic attraction and molecular cohesion. There is thus formed from the molten metal stream a continuous film or layer of uniform section and thickness which is adheringly carried by the solid moving surface to which the film or layer gives up heat from the instant contact is established.

The cross-section of this molten metal film is directly determined and controlled by the following relation:

Its cross-sectional area multiplied by the velocity of the moving metal surface carrying it is equal to the cross-sectional area of the molten metal of the molten metal stream multiplied by its velocity of flow.

For example, if a stream of molten metal flowing from a rectangular nozzle 2 inches wide by ½ inch thick at a velocity of 2 feet per second is laid upon a metallic surface moving at 50 feet per second, or 25 times as fast, the molten metal film will have a section as follows: 2 multiplied by ½ multiplied by 2 and divided by 50 equals .04 square inch, and the thickness of the film will be .04 divided by 2 inches or .020 inch.

All molten metals, alloys and substances in their liquid and freely mobile state (with the exception of some substance or metals which have a very high surface tension, such as mercury) will wet and adhere to a clean, dry, colder metallic surface and be accelerated to the speed and in the direction of motion of the metallic surface in the above stated film form. The adhesive force involved is of considerable magnitude as the wetting action between the molten metal and moving metallic surface precludes the presence of air or gases between them. Furthermore, the perfect contact due to the wetting action allows full freedom for the force of interatomic attraction to take place between the metal of the moving surface and the molten metal or alloy used. This force also is of considerable magnitude to the square inch.

The two above indicated factors, whether or not others be involved, can readily account for the fact that the moving metallic section and the film of molten metal adhered to it act as a single composite section moving at the same speed and in the same direction until the molten metal film loses complete adhesion by shrinkage due to solidification. Even after such loss of adhesion the now solidified film retains the original velocity and direction imparted to it by the moving metallic surface.

While the film of molten metal still adheres to and is carried by the moving surface in absolute contact with it at its speed and in its direction of motion, as, in effect, a single bimetallic section, the heat exchange throughout the thicknesses of the molten metal layer and the solid moving surface is directly proportional to their respective heat conductivities, to the heat gradient between them and to the duration of their contact. These coefficients of heat conductivity are known properties of meals, alloys and many other substances. This makes it possible to mathematically determine and design the elements of production machines to exactly accomplish any definite cooling purpose and to keep under absolute control the amount of heat conducted away from the molten metal or substance in the film form.

From the above, it is clear that any definite amount of heat content can be removed from any molten metal or other film either to cool it slightly, to undercool it to any desired degree or to completely solidify it in such manner that the film can be continuously used when it reaches the desired temperature or undercooled condition. The latter, as stated, results from a definite time and length of contact with the moving surface. The fully formed film is continuously separated from the moving cooling surface at a precisely predetermined point after it has had a definite length of contact with such surface. As the film is removed it is continuously directed to and introduced into a mold or die prepared to receive it.

The following illustrate how such results can be accomplished in accordance with my present invention.

I

When the metal film is to be used with a reduced amount of cooling—for instance, when it is to be directed and impacted at high velocity into intricate dies for die-casting—I use a moving metallic surface made of metal of relatively low conductivity, such as steel. This surface may be oxidized, painted or coated with a non-metallic substance to further reduce its heat conductivity and to lessen the interatomic force of adhesion of the molten metal film to such surface during the wetting action. The extent and duration of contact between the film and the moving surface is adjusted in order to remove the exact amount of heat desired. Immediately this is accomplished the direction of the moving surface is suddenly and continuously changed by the equipment described hereafter. This causes the film to separate from the moving surface at the above point and to keep travelling at the original speed and in the original direction of motion imparted to it. Under these conditions it passes directly into the feeding hole of the die and is impacted at high velocity in the die cavity.

II

When the film is to be used in a state of undercooling such that it will have the maximum number of crystal nuclei and its latent heat of fusion mostly or entirely removed, I use a clean, dry metallic surface to insure perfect contact, wetting and adhesion of the metal film, and rapidly remove the heat content of the film. The exact amount of heat to be removed from the metal film to place it in the above indicated state of undercooling is mathematically calculated and predetermined; so also is the exact length of contact with the moving metallic surface. Taking all the necessary factors into account, the machine is set or designed so that the moving surface will form and carry the metal film for that exact length required, immediately subsequent to which the direction of motion of the moving surface is suddenly and continuously changed to create sufficient force to separate the metal film from the moving surface and to keep the metal film travelling in the acquired direction and at the acquired velocity to fill the mold or die. Alternatively the undercooled metal film may be lifted or otherwise separated from the cooling surface by a mechanical device and directed into the mold or die. The film may also be aggregated and consolidated with another similarly formed and undercooled film and the composite film caused to continue to travel in the acquired direction at the acquired velocity to fill molds or dies. I can readily attain this result since I have noted that when the metal film reaches the above described state of undercooling, in which the solid phase is partly or entirely precipitated, the force of adhesion to the metallic moving surface is proportionally so lessened that the film is practically self-separating from the surface; hence change of direction of this surface effects a clean and complete separation. It is to be noted that this film still has the original homogeneous composition of the molten metal free from segregation. Only heat has been removed from it to create an undercooled condition. There is a uniform distribution of crystal nuclei throughout its mass and no change whatever has been made or induced in its original chemical composition due to lack of contact with or action of other elements capable of reacting chemically with it. Therefore, the products formed from this film as it fills molds or dies and spontaneously crystallizes will have all the advantages of the original homogeneous chemical composition of the molten metal with a uniform crystalline structure free from segregation.

This described formation of a stream of molten metal or other substance into a thin film, the undercooling of the film and the impacting of it into molds or dies without any contact with or contamination by air or gases has very definite industrial advantages long sought after but never before attained so far as I am aware. The operations can be carried out very rapidly and are directly applicable to treat the output of present melting furnaces at the rate at which the molten metal produced has to be disposed of to retain its adjusted composition and fluidity. For instance, the normal stream from a ladle of steel as now poured into large size ingot molds at rates varying from 1000 to 3000 pounds per minute can, as above described, be formed into a film and undercooled to a definite and constant temperature before that film is directed into the molds. The required equipment is relatively simple and inexpensive and consumes an insignificant amount of power. In many cases the whole operation represents actual savings in cost as the heat from the molten metal film can be largely recovered or recuperated.

My invention is distinct from those procedures which involve the continuous melting of wire or the like in an oxy-acetylene or oxy-hydrogen flame and the atomization thereof by a blast of air under high pressure. It is equally distinct from procedures in which a small stream of low temperature metal is atomized by a blast of air or gases under high pressure and directed to a receiving plate or matrix. Neither of these is capable of utilizing molten metals from large industrial furnaces at the usual rate of disposal. Moreover, the amount of high pressure air or gases required for atomization is very expensive per pound of metal atomized and, in addition, the metal so atomized is unavoidably oxidized or chemically contaminated. This results in alteration or deterioration to such extent that the solid atomized product or coating obtained has no real resemblance in appearance or properties to the solid metal wire or liquid metal from which it was produced.

In accordance with the principles of this invention it is not difficult in industrial applications to make the moving metallic surface of such metal and of such thickness and length that the temperature of the moving metallic section used for cooling will not exceed a temperature of about 500° F. or any temperature sufficiently high to cause distortion, deformation, or surface deterioration of the cooling metal used. In this connection the controlling factors or desiderata are susceptible of precise predetermination or of exact mathematical calculation. Furthermore, as only a limited and definite length of this cooling metallic section contacts with a molten metal film of a constant selected thickness, such cooling section can be continuously cooled by air, water, mercury or other coolant after the metal film has separated from it and thus restored to its original temperature before it again receives molten metal. This ensures constant temperature conditions in the cooling of the molten metal stream and a truly continuous operation.

Most metals and alloys in their molten state contain dissolved or occluded gases which are liberated when the solid phase precipitates and the metal solidifies in a mold. Some of these gases are entrapped within the solidified metal products in the form of gas pockets which are highly objectionable and detrimental. In my invention all or substantially all these gases are free to escape, being liberated and removed while the metal film adhered to the moving surface cools rapidly. As the solid phase starts to precipitate before the undercooled film is directed into a mold or die, the products formed from such undercooled metal or alloy will be free from gases.

By undercooling the molten stream from a ladle or furnace before it is directed into a mold, I can induce spontaneous crystallization throughout the whole mass of the product molded, thus providing an effective means for physically controlling a uniform grain size in the formed solid product. Certain variations may be made in the section of the uniform crystals formed by varying and regulating the amount and temperature of undercooling.

The foregoing applies with equal force to non-metallic or organic substances in the molten state such as molten glass, molten rocks, etc., and is in no way limited to metals and alloys.

My invention makes possible the production and commercial use of the new and special primary crystalline structure given to metal products in accordance therewith. This new primary structure of high strength and improved physical properties is obtained without mechanical working or heat treating, is characterized by minute stringer-like at random (unoriented) crystals substantially identical in size and section, homogeneously and uniformly distributed throughout the whole mass and every part of the solid product. My invention also ensures uniformity of chemical composition throughout the whole mass of the product and improved physical properties free of any directional effect due to the prevention of the defects generally inherited from a primary ingot or cast structure, such as segregation, non-uniform chemical composition, concentration of impurities and sonims at the grain boundaries of columnar crystals, pipe, gas pockets, etc. and flow lines due to mechanical working and crushing of large crystals.

This new special primary structure retains most of the above characteristics after mechanical working such as rolling, forging, extrusion and/or heat treating to which it responds more readily on account of its uniformity, giving the so-worked or treated product a distinctive structure different from similar products originating from an ingot or from conventionally cast molten metal. Furthermore, the chilling effect of the mold walls occurring when molten metal is poured into a mold, the formation of the subsequent chilled layer or skin and the distinct zones of crystallization are eliminated from the products made from undercooled metal or alloy.

My invention also provides a new crystalline structure in alloys and more especially in alloys high in alloying components such as high speed tool steels and the stainless irons and steels. In these alloys, as now cast from the molten state either in sand castings or ingot molds, a selective solidification of the component metals unavoidably occurs within the columnar and equiaxed crystals formed and as this takes place it gives to the crystals a most heterogeneous chemical composition with segregation of certain components and impurities at the crystal boundaries, thus considerably reducing the inherent specific properties of these alloys for which they have been developed and are used, such as resistance to corrosion, acids, abrasion, red hardness and cutting ability as well as other physical properties.

By undercooling the molten alloy to the point where it will spontaneously crystallize throughout the mass of the solid product formed, in accordance with my invention, the original homogeneous composition of the alloy in the molten state is fully retained in every one of the minute crystals formed and such is retained after mechanical working and heat treating. This entirely new and different structural crystalline condition considerably increases the known intrinsic properties of these alloys and widens the field of their usefulness.

Figures 1, 1A:
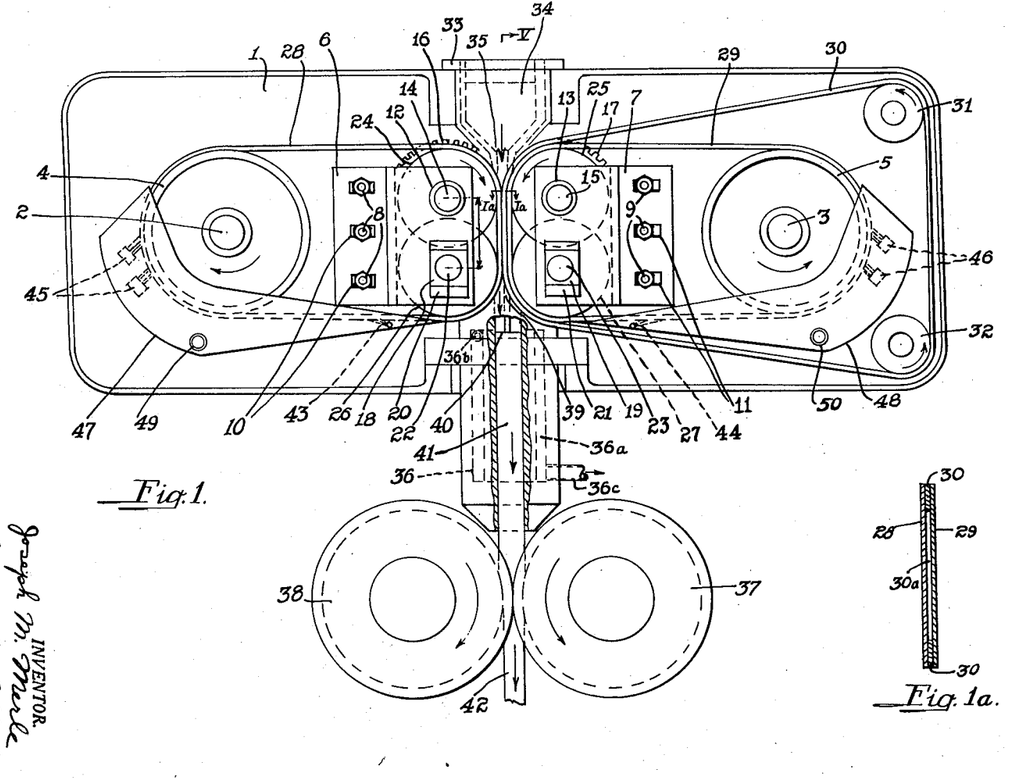
Figure 1 is a vertical elevation, partly in section, of an apparatus adapted to form a continuous rod-like casting or product directly from molten material.
Fig. 1A is a sectional view taken on line 1A—1A of Fig. 1.
Figures 5, 6:
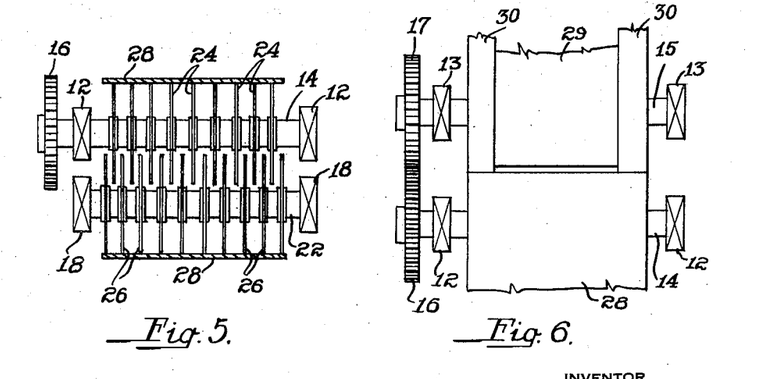
Fig. 5 is an end elevational view, partly in section, of the arrangement of vertically aligned and spaced shafts looking from left to right in Fig. 1.
Fig. 6 is a fragmentary plan view of the upper pair of horizontally aligned shafts of Fig. 1 with certain associated structure.

Referring now to the drawings, Fig. 1 illustrates a two-belt cooling and impacting machine embodying my present invention. In this machine, the main frame casting 1 is provided with shafts 2 and 3 fixedly mounted in the casting 1. Each such shaft is preferably set on a take-up sliding casting member adjustable under a definite spring or hydraulic tension, not shown. Freely rotatable drums or pulleys 4 and 5 are respectively mounted on shafts 2 and 3. Yoke-shaped castings 6 and 7 are mounted one on either side of the center line of main casting 1. These castings 6 and 7 can be adjusted toward and away from the center line by means of bolts 8 and 9 passing through corresponding slots 10 and 11 of these two castings. Each of the castings 6 and 7 has two bearings 12 and 13 respectively, for the shafts 14 and 15 which extend in back of main frame casting 1 as will be understood from Fig. 6. Meshing gears 16 and 17 are mounted at the back ends of these shafts 14 and 15 and shaft 14 is further directly connected as by a suitable coupling, not shown, to a variable speed drive, not shown, or is provided with a pulley which is operated by a belt, not shown, driven from a motor, not shown. It will be clear that when shaft 14 is rotated at a certain or desired speed the shaft 15 is rotated at the same speed and in the opposite direction through the gears 16 and 17.

Under shafts 14 and 15 and in vertically spaced alignment therewith, bearings 18 and 19 are provided on both sides of the yoke-shaped castings 6 and 7. These bearings are adjustable in slides 20 and 21 so that the shafts 22 and 23 supported in and by these bearings can be adjusted toward and from shafts 14 and 15 to vary the vertical spacing. On each of the shafts 14 and 15 a series of spaced discs 24 and 25 is keyed or secured. Each disc 24 or 25 is of the same diameter and the discs of each series are evenly spaced. Similarly, discs 26 and 27 are keyed or secured to shafts 22 and 23 but the discs 24 are staggered with respect to discs 26 and the discs 25 are staggered with respect to discs 27 (see Fig. 5) so that when shafts 14 and 22 or shafts 15 and 23 are rotated the staggered series of discs will not contact or rub.

An endless metallic belt 28 made of steel, copper or copper alloy passes over drum 4, which may be suitably flanged for belt-guiding purposes, and over the discs 24 and 26 which form a discontinuous cylindrical face of uniform diameter. In the same way an endless metallic belt 29 passes over flanged drum 5 and over the discs 25 and 27 also forming a discontinuous cylindrical face of uniform diameter. A suitable tension take-up is provided for each drum and belt so that belts 28 and 29 will always be under the proper tension regardless of the adjusted space between shafts 14 and 22 and between shafts 15 and 23.

The machine is constructed to accommodate belts of a definite width and thickness. The thickness and material selected for each belt determine the smallest diameter of drum or pulley over which it can be bent without giving it a permanent set as the bending stress must be below the elastic limit of material of the selected composition and thickness to insure a long life of trouble-free operation. The other determining factor in the construction of the machine is the length of contact, required by a film of molten metal of a definite thickness, with belt or cooling sections of the material and thickness selected in order to conduct a definite amount of heat to the belt or cooling sections at the available or predetermined velocity of travel of both film and cooling sections. This length of contact for any given velocity conditions can be mathematically calculated for every metal used. In forming a thin film at high belt velocity I have found that the length of contact required to undercool the molten metal to its freezing point is comparatively small. I have developed the present construction to fit both the necessity for a large diameter pulley so as not to stress unduly the material of the belts and the necessity for a short distance between the centers of the pulleys supporting the belts, the latter being the desired length of contact of the film with the two moving belts. Thus I have made it possible to satisfy and adjust the two above referred to major controlling factors.

Two endless spacer belts 30 run over grooved pulleys 31 and 32 and these belts are disposed flush with and parallel to the edges of belt 29 to insure an opening 30a of predetermined or adjustable size which determines the width and thickness of the metal film formed. The belts 30 are driven by friction from belts 28 and 29 when these latter belts are driven as will be understood from Figs. 1 and 6 in particular. A snug relationship can be obtained and maintained by appropriate adjustments of yoke-shaped castings 6 and 7.

A receptacle 33 is set above discs 24 and 25 and supported so that its tapered bottom end will bear over belts 28 and 29 with only enough friction to insure a complete air seal of the molten metal or substance 34 running through its bottom orifice or outlet 35.

A mold 36 is also supported under discs 26 and 27 so that it will bear sufficiently upon belts 28 and 29 to insure complete air seal. This mold may have a water jacket 36a through which water is circulated, being fed by pipe 36b and exhausted by pipe 36c. Mold 36 may be set over a pair of horizontally disposed rolls 37 and 38 whose peripheral speed is adjustable to the speed of operation of the above machine.

In operation, the molten metal 34 is discharged from receptacle 33 through outlet 35 by the motion of belts 28 and 29 at a rate depending upon the velocity of these belts and the size of the opening 30a, being thus formed into metal film 39. Without any contact whatsoever with air, this metal film 39 gives up heat to belts 28 and 29 whose length of straight travel has been predetermined or adjusted to conduct away a definite and preselected amount of heat from this metal film depending upon their thickness, heat conductivities, and surface condition. At the end of the straight travel of the belt, the cooled film 39 becomes separated from belts 28 and 29 and continues to travel in the same direction and at the same speed imparted to it by these belts, still without any contact whatsoever with air. The film then impacts itself at its high velocity on the top surface 40 of the previously impacted casting 41 which has solidified in and is being withdrawn from mold 36, both these operations proceeding continuously and simultaneously. Thus the formed casting 41 is continuously withdrawn from water jacketed mold 36 by rolls 37 and 38 producing a finished solid product 42 in a continuous length as long as molten metal is furnished to receptacle 33.

As the undercooled metal film 39 will readily shape itself to the contour of the mold 36 under its acquired high velocity, due to its being still plastic when it reaches the mold, and will spontaneously crystallize in and upon the mold, continuous products of any shape such as rods, bars, slabs, rails, beams, angles, channels, special shapes, etc., can be produced which can be further shaped, finished and surfaced by the rolls 37 and 38 which continuously withdraw the products from mold 36. These products have and will retain the special chilled structure described hereinabove.

To remove the heat conducted to belts 28 and 29 while forming and cooling the film 39, both these belts receive a stream or spray of water as indicated at 43 and 44 acting on the lower reach of each of these belts before they pass around drums or pulleys 4 and 5. The construction of the machine enables this length to be such that the water or other coolant will entirely dissipate the heat acquired in cooling the molten metal. Any water left on these belts is removed by squeegees 45 and 46 which render the surfaces of these belts clean and dry before they come again in contact with the molten metal stream. Water collecting in hoods 47 and 48 is drained off through pipes 49 and 50.

Figures 2, 3:
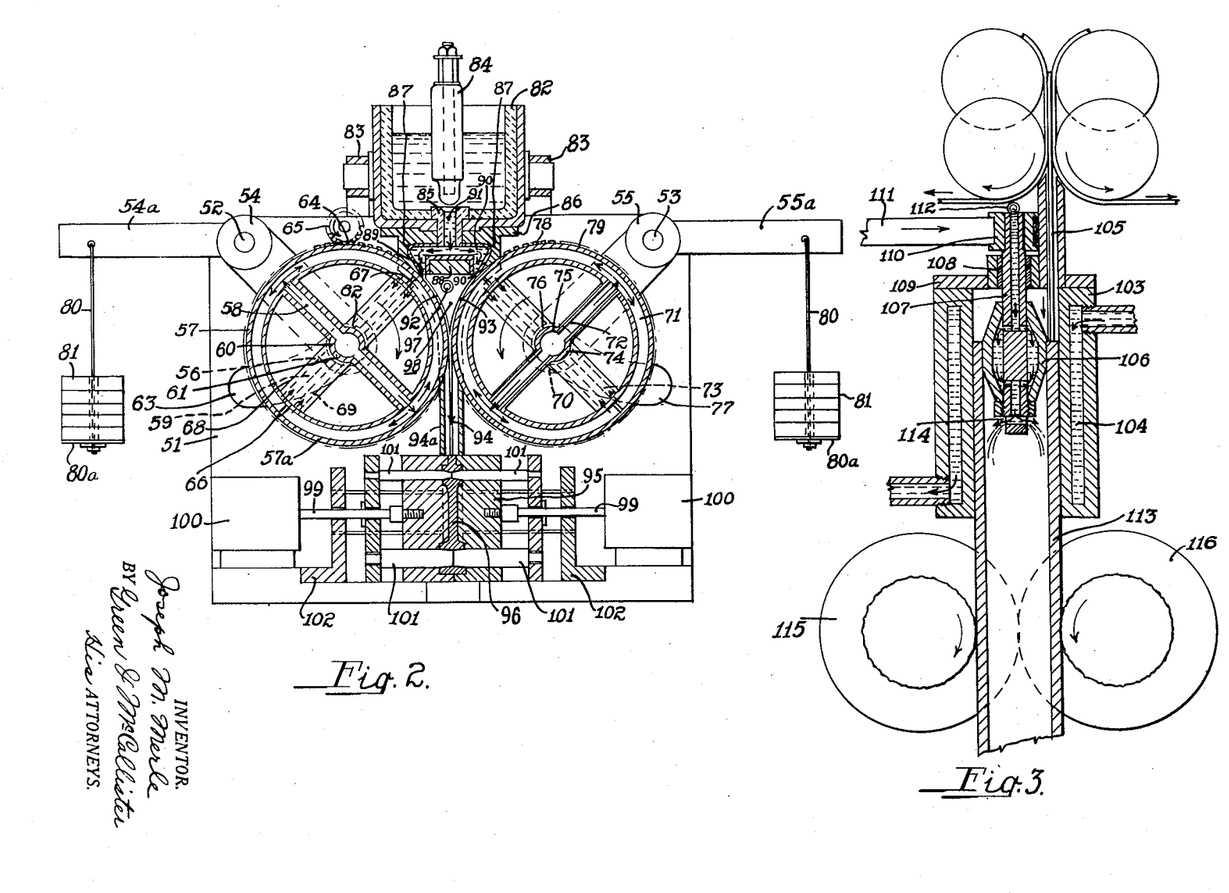
Fig. 2 is a vertical sectional view, partly in elevation, of an apparatus adapted to mold or die cast individual products from a divided and recombined stream of molten metal or other molten material.
Fig. 3 is a vertical sectional view, partly in elevation and partly in diagrammatic form, of an apparatus adapted to produce a continuous tubular product such as a seamless tube directly from molten metal or other molten material.

Figure 2 illustrates a modified form of cooling and impacting machine in which the cooling moving surfaces used are the faces of two rotating water-cooled cylinders. The main frame casting 51 supports two stationary shafts 52 and 53 around which yoke pieces 54 and 55 are adapted to swing. In the yoke end 56 of yoke piece 54 there is supported a water cooled ring 57 connected by hollow arms 58 and 59 to hub 60 whose ends in the form of a hollow shaft 61 are supported in bearings 62 of yoke 54. This shaft 61 extends outside of yoke 54, the extension being free to swing in slot 63 of main frame casting 51. A gear 64 is keyed or secured on the extended end of shaft 61 and has the same or about the same pitch diameter as the ring face 57a of ring 57. When ring 57 and gear 64 are in operating position as shown, the gear 64 will mesh with the pinion or gear 65 of an associated variable speed drive, not shown. Thus ring 57 will be rotated in the proper direction and at any desired and preselected peripheral speed.

Water or other liquid coolant is conducted through hollow arms 58 to the water-jacketed section of ring 57 and, flow being limited by baffles 66 and 67, is exhausted by conduits 68 and 69 in each arm 59. The coolant is thus returned to shaft 61 which has water intake connections at one end and water offtake connections at the other end to provide for the continuous circulation of water or other coolant.

Similarly, in the yoke end 70 of yoke piece 55 there is supported a water-cooled ring 71 connected by hollow arms 72 and 73 to hub 74 whose ends in the form of hollow shaft 75 are supported in bearings 76 of yoke 55. This shaft 75 extends outside of yoke 55, the extension being free to swing in slot 77 of main frame casting 51. On the extended end of shaft 75 there is keyed or secured a gear 78 of the same or about the same pitch diameter as ring face 79 of ring 71. When this ring 71 and gear 79 are in operating position, as shown, the gear 78 will mesh with gear 64, the rotation of which will rotate the face 79 of ring 71 in the opposite direction from and at the same peripheral speed as ring face 57a of ring 57. Ring 71 is cooled by water circulation in the same manner as already described in connection with the ring 57.

Yoke pieces 54 and 55 have an extended arm 54a and 55a, respectively, as shown. A rod 80 supporting a plate 80a at the bottom is attached to each of these arms. Grooved weights 81 rest on plates 80a and can be so adjusted as to counterbalance the yokes 54 and 55, the rings 57 and 71 and their gears under a positively adjusted load.

The width of face 79 of ring 71 and face 57a of ring 57 is suitably made or selected in each case for the width of metal film desired to be produced. The thickness of these cylindrical faces and the material of which they are made, for example, steel, cast iron, copper, or other high heat conductivity metals, are so selected and determined as to remove a definite amount of heat from films of various molten metals or substances of various thickness which are to be formed and carried thereon for definite and adjustable lengths of contact as governed by the factors above explained. As previously indicated, the surface condition of these faces 79 and 57a can be made such as will appropriately influence the rate of heat conduction from the molten metal film depending upon the results desired in any given instance. The diameter of rings 57 and 71 is made large enough so that the heat conducted to any portion of faces 57a and 79 will be dissipated from it by the cooling system before that portion again receives molten metal.

A receptacle 82 is positioned over the upper bight between rings 57 and 71 by means of brackets 83 of frame 51. This receptacle is adapted to receive molten metal or other molten substance from a melting furnace or ladle, not shown, and to maintain a molten supply for operating purposes. It may have a stopper 84 actuated by a goose neck and operating lever of known construction to open and close nozzle 85. Thus a continuous stream of molten material may be discharged through the nozzle 85 or successively regulable amounts of molten material may be intermittently discharged.

Under the receptacle 82 I provide a distibuting chamber casting 86 in the form of a closed rectangular channel. This chamber casting is wider than the faces of the rings and has the two faces opposite these rings machined complementarily to the radius of the rings. There is a slot in the middle of the casting made to correspond to the maximum width of film to be formed by the machine but narrower than the width of faces 57a and 79 so that the edges of the slot will leave enough surface bearing against the ring faces to insure a perfect air seal between the casting 86 and said ring faces when these rings are rotated. This arrangement provides an opening of definite size between the ring faces at their points of contact. Recessed or grooved sides 87 are provided in the casting 86 which serve to confine or retain in place a side packing, thus further sealing the edges of rings 57 and 71. Inside of casting 86 I provide a cored casting 88 which forms a rectangular chamber having two slots 89 and 90 of selected width and thickness.

The metal stream 91 from nozzle 85 flows through the rectangular chamber, which is preferably lined with refractory material, and is divided into two equal streams which discharge through the said slots 89 and 90. Each of these two streams contacts one of the ring faces 57a or 79, shapes itself thereto and is carried by it in the form of a separate film 92 or 93, the dimensions of which correspond to the supply slots 89 and 90. Both films travel at the same speed for a definite length of cortact with the cylindrical cooling faces, this length having been previously calculated and then secured by appropriately adjusting the positions of the feeding slots 89 and 90 so that the required amount of heat will be removed from the films at the instant the predetermined length has been traveled. When reaching that point the two separate films are caused to aggregate or consolidate into a single recombined film or strip 94. This may be done by setting the space between ring face 57a and 79 equal to the total thickness of the two films. The further travel of the consolidated film is along a vertical straight line as will be understood from Fig. 2.

This film 94 travels in the direction stated through bottom channel chamber 94a absolutely free from air contact and friction against the walls of this channel; consequently, in an unbroken, undivided and unoxidized form it reaches the feeding opening of a mold or a die 95 to impact and shape itself under its velocity of motion to the contour of the cavities or impressions 96 of this mold or die.

A duct or pipe 97 leads to the space 98 to exhaust air from it so as to carry out the whole operation in a vacuum or to circulate or introduce gases of various compositions thereinto when it is desired to operate in a special atmosphere to induce a desired chemical reaction with the film or films of molten metal.

While mold or die 95 may be of any suitable form and construction, I have illustrated one in two parts, each of which is connected by a rod 99 to an air or hydraulic piston indicated at 100. The die is provided with core plates 101 and ejector pin plates 102. It is to be understood, however, that other types of molds or dies may be supplied by this machine such as ingot molds, sand molds or continuous molds. The machine of Fig. 2 can be designed for such size or capacity as will form, cool and direct a thick consolidated film at relatively low speed into a mold or it can be made of such size that it will withstand high peripheral wheel and face speeds to form two very exceedingly thin metallic films only a few thousandths of an inch in thickness and propel the film consolidated therefrom into dies or mold cavities without any frictional loss of speed at velocities unobtainable with present die casting machines. The die-cast or other products will, moreover, be characterized throughout their entire mass by the new and desirable primary chill structure hereinabove described.

Fig. 3 shows a round stationary continuous mold 103 having a water jacket 104 and adapted to produce seamless tubes or tubular products. The consolidated undercooled metal film 105 may be supplied by a machine such as that described in either Fig. 1 or Fig. 2. This film 105 of predetermined dimensions and at the desired temperature of undercooling is propelled out of contact with air into the side of the mold 103, as shown. This is readily accomplished as the film thickness is only a few thousandths of an inch and less than the thickness of wall of the resulting tube produced. Centrally located in mold 103 is a mandrel 106 of the requisite size to produce a tube of desired inside diameter. This mandrel is held at a definite height in the mold and has a hollow shaft 107 rotatable in bearing 108 of mold top or cover 109. Pulley 110 is secured to shaft 107 and is rotated by a belt 111 attached to and actuated by a suitable motor, not shown. A stream of water passes from a pipe 112 through hollow mandrel shaft 107 and into the interior of the mandrel itself whence it discharges against the inside of the tube 113 being formed through the passageways indicated at 114. Thus the mold and mandrel are kept at a constant temperature and the tube 113 is cooled as it is formed.

Tube 113 is pulled out of continuous mold 103 by rolls 115 and 116 which withdraw the formed tube at a rate of speed adjusted to the speed of formation thereof, this latter depending upon the rate of supply of film 105. As it retains some plasticity and mobility, the undercooled film will shape itself under its acquired velocity to the annular contour between mold 103 and mandrel 106 and will crystallize with the hereinbefore described structure. The water-cooled mandrel 106 is rotated at a sufficient peripheral speed to overcome the reduced amount of shrinkage of the wall section of the tube 113 which is formed. In this manner tubular products of good inside and outside surfaces and uniform structure of optimum physical properties can be made in continuous lengths from molten metal, alloys, or other substances with a negligible amount of power.

Figure 4:
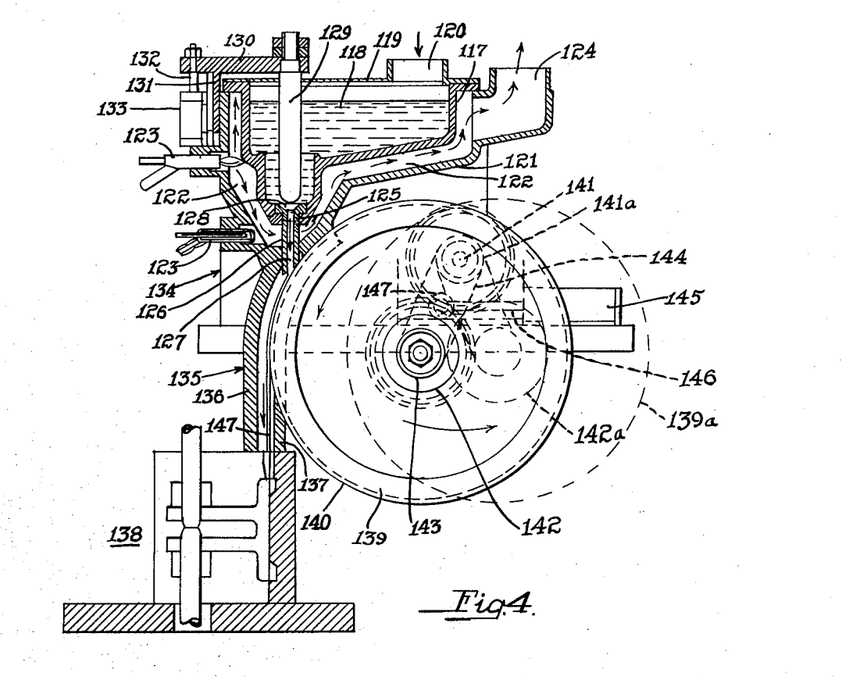
Fig. 4 is a vertical sectional view, partly in elevation, of an apparatus similar to that of Fig. 2 but wherein the molded or die cast product is made from a single stream of molten metal or other molten material.

In Fig. 4 I have illustrated a modified form of apparatus which in certain respects is generally similar to the apparatus of Fig. 2 and is adapted to form intermittently from a single stream of molten material a succession of molded or diecast products. In Fig. 4 the numeral 117 indicates a receptacle for molten metal or other molten material which may be made of any suitable material capable of withstanding the temperature of the molten substance 118 therewithin. This receptacle 117 is provided with a cover 119 which has a charging opening 120 at one side thereof by means of which molten metal may be introduced into the receptacle from a melting furnace, ladle or the like, not shown, or in the solid state.

It will be noted that the receptacle 117 is surrounded by a spaced body member or casting 121 of generally similar shape to the receptacle itself, thus providing a chamber or flue 122 between the receptacle 117 and the casting 121. Hot gases are adapted to be circulated in said chamber for the purpose of maintaining the material in the receptacle in a molten condition or to melt this material if it is of low melting point such as lead, zinc, aluminum or alloys. This may be readily accomplished by providing one or more burners 123 of any suitable type and design which burn gas or other suitable fuel to keep the chamber 122 full of hot gases of combustion, an educt for which is indicated at 124.

In the bottom of the receptacle 117 I provide an aperture 125 in which is disposed a discharge tube 126, the bore 127 of which flares at the upper end at 128 so as to form a seat for the bottom of valve or stopper 129. This valve or stopper is secured to and depends from a plate 130 supported by an upright member 131 suitably associated with the casting 121 in such manner that members 130 and 131, and hence the valve or stopper, is adapted to be raised and lowered to open and close, respectively, the orifice in the bottom of the receptacle. This raising and lowering action may be secured in any suitable manner such as by the use of a rod 132 secured at one end to plate 130 and operating in a piston, dash pot or solenoid 133. The casting 122 is, as indicated, a portion of the main casting 134 on which the apparatus is mounted.

Extending downwardly from the lowermost portion of casting 121 is a somewhat arcuate tubular casting 135 having one continuous side wall 136 and one discontinuous side wall 137, the interrupted surfaces of the latter being formed on the arc of a circle and thus forming bearing surfaces for a purpose which will be apparent hereinafter, these bearing surfaces being kept lubricated in suitable manner.

Associated with the lower end of this arcuate casting 135 is a suitable mold or die 138 which may be of any suitable or desired form which, per se, forms no part of the present invention. Such mold or die is made in two parts provided with the desired grooves or configurations on the inside so that when the two parts are assembled the grooves define the shape of the product to be made therein.

Mounted on the main casting 134 is a relatively large wheel or cylinder 139 which is provided with circular edge flanges 140. This wheel or cylinder is driven from an eccentrically disposed shaft 141 having a pulley 141a. A small wheel, gear or disk 142 having a pulley 143 is driven through belt or chain 144. Due to this arrangement, wheel 139 may be swung about shaft 141 into the dotted lines position marked 139a. Member 142 at the same time moves to dotted line position 142a. In the positions the machine is inoperative but may be readily rendered operative again by causing the parts to assume their full line positions. In the dotted line positions repairs or adjustments may be made, if needed, or the machine may merely be "at rest."

A piston 145 in which piston rod 146 operates serves to move disk 142 to position 142a or vice versa. For each position of the disk 142 the flanged wheel 139 has a corresponding position. A roller, gear, or the like 147 is provided on the end of piston rod 146 for actuating purposes. Since the apparatus operates intermittently or discontinuously, it is an advantage to have disk 142 and flanged wheel 139 in an "at rest" position from which it can be rapidly and conveniently restored to working position when material 118 is flowing through the apparatus and producing a film 147.

In operating the apparatus of Fig. 4, molten material is charged into the receptacle 117 and the temperature thereof is maintained sufficiently high to retain that material in its molten state. Flanged wheel 139 is moved into the full line position in which it closes the discontinuous side 137 of casting 135 and the wheel is then rotated counterclockwise at a suitable velocity. Now the stopper 129 is raised for a sufficient period of time to allow enough molten material to be discharged through tube 126 to fill the mold or die 138, this being previously known or calculated as will be understood from the recited description in connection with Fig. 2. The stopper is then lowered to close the orifice after the desired amount of molten material has been discharged. As the molten material leaves the tube 126 it intercepts the metal surface of the flanged wheel 139 and is immediately accelerated to the velocity of such wheel. During this time the metal assumes a film-like form and becomes plastic or semi-solid in its condition to a sufficient extent to enable it to become separated cleanly from the wheel, as shown, and to travel at its acquired velocity and in its acquired direction into the mold or die cavities where under its force of impact a molded or die-cast product is formed which has a primary chilled structure of uniform composition as hereinabove explained. As explained above, also, the duration of contact of metal and wheel is predetermined to produce the required condition in the metal. After the desired length of time, the mold is opened and the product removed therefrom and this product has properties and characteristics at least equal to products formed by more conventional procedures and, in many cases, exceeds such prior products in quality.

The foregoing is intended as illustrative rather than restrictive, and I may make suitable changes therefrom without departing from the spirit and scope of the invention.

Having thus described my invention, what I claim is:

1. In an apparatus for producing a solidified metal product from undercooled molten metal, a mold adapted to have a plastic undercooled metal in the form of a thin film free from contained gases impacted therein, to shape the undercooled metal in the desired form, means for discharging a quiescent consolidated stream of molten metal, and means interposed between said discharge means and mold for receiving said quiescent consolidated stream of molten metal and undercooling and shaping such stream into a thin metal film and impacting it into said mold in a plastic undercooled condition free from contained gases comprising a pair of rapidly moving smooth metal heat-absorbing elements laterally spaced in parallel relationship with respect to each other to form a downwardly moving upright passageway therebetween, means for driving said elements at the same speeds in opposite directions, greater than the speed of discharge of the metal stream, to cause the opposite walls of said passageway to travel in the same downward direction at a high velocity, and said passageway forming a metal accelerating and chilling surface and being of a length and thermal conductivity in relation to the thermal conductivity and thickness of the molten metal film, to remove under a predetermined length of contact of the molten metal film with said passageway a definite amount of heat from the molten film previous to the direction of the metal film into said mold, to cause said metal film to be impacted into said mold in a plastic undercooled condition, to provide instantaneous crystallization of the molded product from a regulated number of uniformly distributed nuclei, and to eliminate burning, corrosion and sticking of the mold.

2. In an apparatus for producing a solidified metal product from undercooled molten metal, a mold adapted to have a plastic undercooled metal in the form of a thin film impacted therein to shape the undercooled metal in the desired form, means for discharging a quiescent consolidated stream of molten metal, and means interposed between said discharge means and mold, for receiving said quiescent consolidated stream of molten metal and undercooling and shaping such stream into a thin metal film and impacting it into said mold comprising a pair of spaced apart endless movable oppositely disposed heat-absorbing metal belts having downwardly movable adjacent facing upright portions forming a downwardly moving rectilinear passageway therebetween, means for driving said elements in opposite directions at the same speeds, greater than the speed of discharge of the consolidated metal stream, said passageway forming a metal accelerating and chilling surface to receive and undercool and form the metal into a thin ribbon-like stream, and said passageway being of a length and thermal conductivity in relation to the thermal conductivity and thickness of the molten metal film to remove under a predetermined length of contact of the molten metal film with said passageway a definite amount of heat from the molten film previous to the direction of the metal film into said mold, to cause said metal film to be impacted into said mold in a plastic undercooled condition, to provide instantaneous crystallization of the molded product from a regulated number of uniformly distributed crystal nuclei and to eliminate burning, corrosion and sticking of the mold.

3. In an apparatus for producing a solidified metal product from undercooled molten metal, a mold adapted to have undercooled metal in the form of a thin film impacted therein to shape the undercooled metal in the desired form, means for discharging a quiescent consolidated stream of molten metal, and means interposed between said discharge means and mold, for receiving said quiescent consolidated stream of molten metal and undercooling and shaping such stream into a thin metal film and impacting it into said mold comprising a pair of spaced apart endless movable oppositely disposed heat-absorbing metal belts having downwardly movable adjacent facing upright portions and a pair of laterally spaced metal belts mounted on and extending along the upright portion of one of said belts adjacent the lateral margins thereof and engaging the upright portion of said other belt, to form a closed downwardly moving rectilinear metal accelerating and chilling passageway therebetween, means for driving said belts in opposite directions at the same speeds, greater than the speed of discharge of the consolidated metal stream, and said passageway being of a length and thermal conductivity in relation to the thermal conductivity and thickness of the molten metal film, to remove under a predetermined length of contact of the molten metal film with said passageway a definite amount of heat from the molten film previous to the direction of the metal film into said mold, to cause said metal film to be impacted into said mold in a plastic undercooled condition, to provide instantaneous crystallization of the molded product from a regulated number of uniformly distributed crystal nuclei and to eliminate burning, corrosion and sticking of the mold.

4. In an apparatus of the character described, a main casting, a fixed shaft mounted thereon, a drum rotatably mounted on said shaft, a yoke-shaped casting adjacent the fixed shaft adjustably secured to the main casting and movable toward and away from the center line thereof, a pair of vertically aligned and spaced shafts mounted in the yoke-shaped casting in parallel relation with respect to each other and to said fixed shaft, and in horizontal spaced relation with respect to said fixed shaft, the lower of which shafts is adjustable toward and from the upper, a series of spaced discs secured to each such shaft in such manner that the discs are staggered and non-contacting, an endless metal belt passing around said rotatable drum and over both said series of discs, means for water-cooling said belt and means for driving one of said shafts for driving said belt, to cause said belt to accelerate and undercool molten metal discharged thereon in a consolidated stream.

5. In an apparatus of the character described, a frame, a drum mounted on said frame for rotation about a horizontal axis, a pair of vertically spaced parallel horizontal shafts mounted on said frame in parallel and horizontally spaced relation with respect to said drum, one of said shafts being adjustable towards and from the other, a series of spaced disks mounted on said shafts in staggered relation with respect to each other so said disks on opposite shafts interleave each other, an endless metal heat absorbing band trained around said drum and disks, means for maintaining tension on said band in all positions of adjustment of said shafts with respect to each other, means for driving one of said shafts and said disks thereon, for driving said band, and said band being trained around said drum and disks in such a manner as to have an upright plane metal propelling surface disposed between said disks adapted to undercool and accelerate a stream of molten metal into a thin metal film, the length of which surface may be adjusted by adjustment of said disks towards and from each other.

JOSEPH M. MERLE.